(12) United States Patent
An (10) Patent No.: US 11,505,413 B2
(45) Date of Patent: Nov. 22, 2022

(54) VERTICAL STRIP ACCUMULATOR

(71) Applicant: DMC CO., LTD., Gyeonggi-do (KR)

(72) Inventor: Sangyong An, Incheon (KR)

(73) Assignee: DMC CO., LTD.

( * ) Notice: Subject to any disclaimer, the term of this patent is extended or adjusted under 35 U.S.C. 154(b) by 260 days.

(21) Appl. No.: 16/901,811

(22) Filed: Jun. 15, 2020

(65) Prior Publication Data

US 2020/0391960 A1  Dec. 17, 2020

(30) Foreign Application Priority Data

Jun. 13, 2019 (KR) .................. 10-2019-0070226

(51) Int. Cl.
| | |
|---|---|
| *B65H 51/20* | (2006.01) |
| *B21C 47/26* | (2006.01) |
| *B21C 49/00* | (2006.01) |
| *B65G 47/84* | (2006.01) |
| *B21D 43/02* | (2006.01) |

(52) U.S. Cl.
CPC .......... *B65G 47/846* (2013.01); *B21D 43/02* (2013.01)

(58) Field of Classification Search
CPC ......... B65H 51/20; B21C 47/26; B21C 49/00; B21C 51/00
USPC ............... 242/364.1, 362, 412.1, 412.2, 552
See application file for complete search history.

(56) References Cited

U.S. PATENT DOCUMENTS

| | | | | |
|---|---|---|---|---|
| 3,888,430 A | * | 6/1975 | Costello ................. | B65H 20/26 242/364.1 |
| 4,012,004 A | * | 3/1977 | Tonellato ............... | B65H 20/24 242/364.1 |
| 4,441,661 A | * | 4/1984 | Steinmair ............... | B21B 41/00 242/364.1 |
| 4,529,140 A | * | 7/1985 | Cooper ................... | B21B 41/00 242/364.1 |
| 5,529,257 A | * | 6/1996 | Abbey, III ............. | B65H 20/30 242/364.1 |

(Continued)

FOREIGN PATENT DOCUMENTS

| KR | 20050001378 A | 1/2005 |
|---|---|---|
| KR | 20060022451 A | 3/2006 |

(Continued)

*Primary Examiner* — Douglas A Hess (74) *Attorney, Agent, or Firm* — Wolter Van Dyke Davis, PLLC; Eugene J. Molinelli; Patrick Herron (57) ABSTRACT

Disclosed is a vertical strip accumulator. The vertical strip accumulator includes an inner drum unit having an inner drum; an outer drum unit installed at an outer side of the inner drum unit; a central drum unit installed at an inner side of the inner drum unit; and an input unit configured to carry a skelp supplied from an uncoiler to the outer drum unit. The outer drum unit includes an outer drum configured to selectively rotate forward and reverse; a first power source configured to provide a power to the outer drum; an outer roller installed to the outer drum; and a first control unit connected to the first power source to control the operation of the first power source. The input unit includes a carrying roller provided in contact with the skelp; a second power source configured to supply a power to the carrying roller; and a second control unit connected to the second power source to control the operation of the second power source.

6 Claims, 10 Drawing Sheets

(56) References Cited

U.S. PATENT DOCUMENTS

| | | | | |
|---|---|---|---|---|
| 5,575,434 | A * | 11/1996 | Steinmair | B21C 49/00 |
| | | | | 242/364.1 |
| 5,601,250 | A * | 2/1997 | Wheeler | B65H 20/26 |
| | | | | 242/364.1 |
| 5,720,444 | A * | 2/1998 | Wheeler | B65H 20/26 |
| | | | | 242/364.1 |
| 6,474,583 | B1 | 11/2002 | Won | |
| 6,520,442 | B2 * | 2/2003 | Heimann | B21B 41/00 |
| | | | | 72/146 |
| 10,048,634 | B2 * | 8/2018 | Kanzawa | B65H 35/0006 |
| 10,696,512 | B2 * | 6/2020 | Manuel | B65H 59/384 |

FOREIGN PATENT DOCUMENTS

| | | |
|---|---|---|
| KR | 100655476 B1 | 12/2006 |
| WO | 2006028328 A1 | 3/2006 |

\* cited by examiner

FIG. 1

[PRIOR ART]

FIG. 2

[PRIOR ART]

VERTICAL STRIP ACCUMULATOR

TECHNICAL FIELD

The present application claims priority to Korean Patent Application No. 10-2019-0070226 filed on Jun. 13, 2019 in the Republic of Korea, the disclosures of which are incorporated herein by reference.

The present disclosure relates to a vertical strip accumulator, and more particularly, to a vertical strip accumulator capable of preventing an excessive tension from being applied to a skelp.

BACKGROUND ART

In general, a vertical strip accumulator is a device that is installed between an uncoiler and a pipe mill to wind and store a roll-type skelp supplied from the uncoiler and simultaneously supply the skelp to the pipe mill. The vertical strip accumulator supplies the stored skelp to the pipe mill while an end of the skelp supplied to the pipe mill is being welded to a front end of a skelp to be newly supplied, so that a product may be continuously manufactured without interruption.

In relation to the vertical strip accumulator, a vertical-type looper was developed by Kent Corporation in USA, and a vertical strip accumulator was provided as an improvement of the vertical-type looper. The vertical-type looper and the vertical strip accumulator are disclosed in Korean Patent No. 10-0313474, Korean Unexamined Patent Publication No. 10-2005-0001378, and the like.

Figure 1:
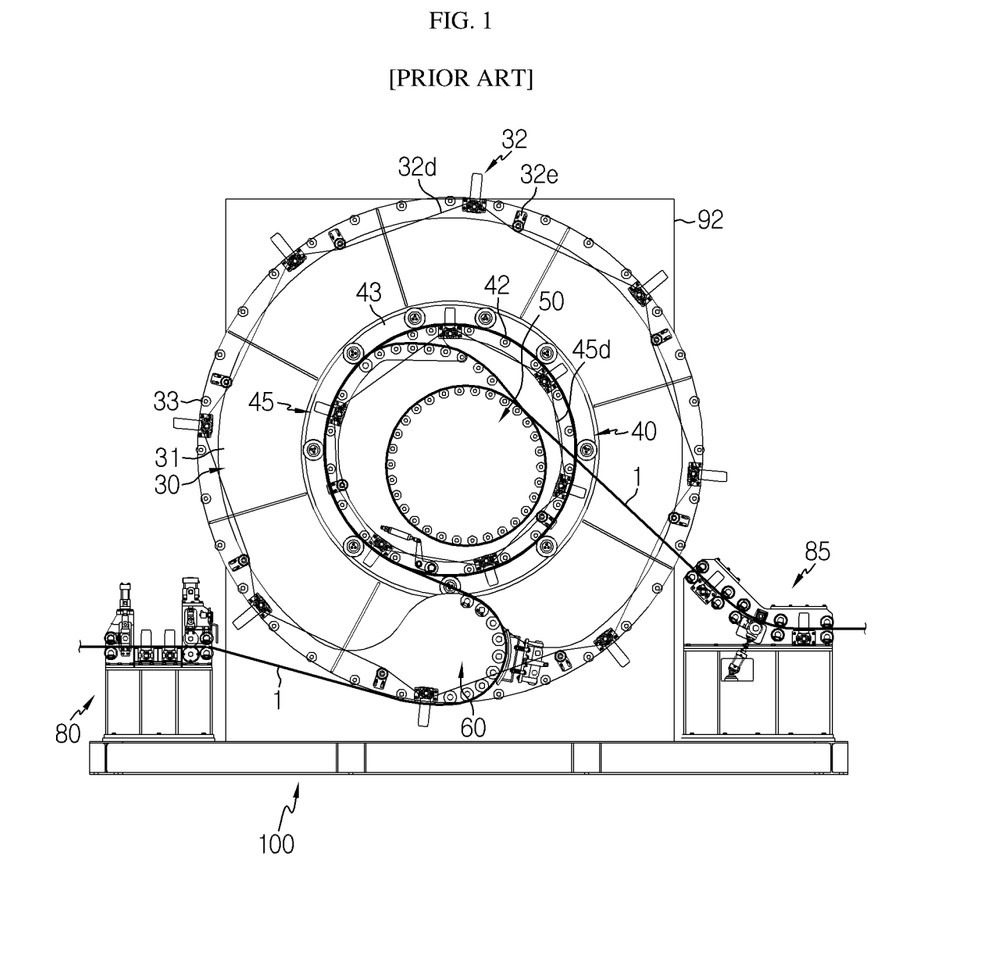
FIG. 1 is a front view showing a vertical strip accumulator according to the first embodiment of the prior art.
Figure 2:
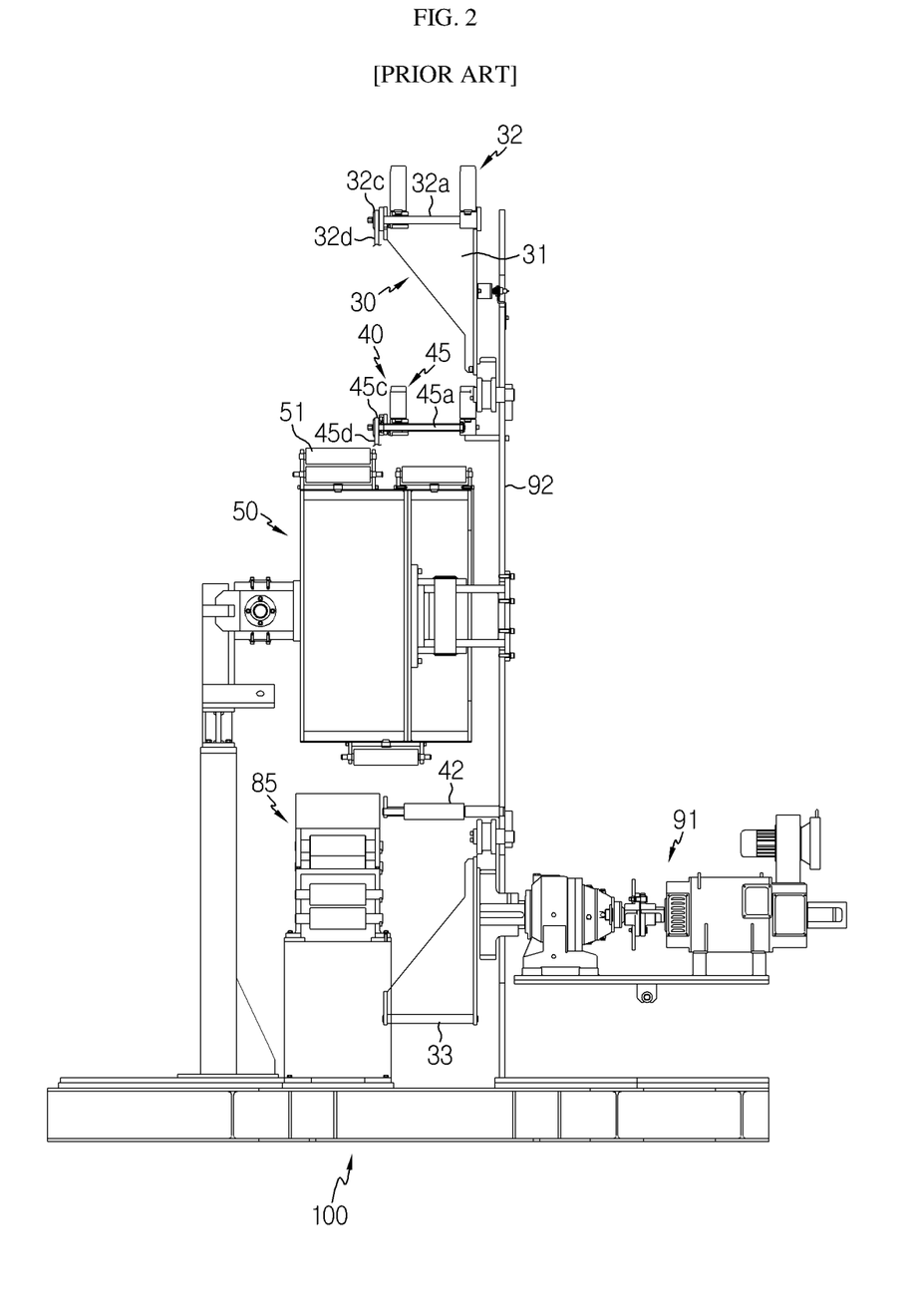
FIG. 2 is a side view of FIG. 1.

FIG. 1 is a front view showing a vertical strip accumulator according to the first embodiment of the prior art, and FIG. 2 is a side view of FIG. 1.

As shown in FIGS. 1 and 2, the vertical strip accumulator includes an outer drum unit 30, an inner drum unit 40 installed to an inner side of the outer drum unit 30, and a central drum unit 50 installed to a base plate 92 to pivot by a predetermined angle inside the inner drum unit 40. A skelp 1 is supplied from an uncoiler (not shown) and discharged to an output unit 85 via an input unit 80, the outer drum unit 30, the inner drum unit 40 and the central drum unit 50 sequentially. The vertical strip accumulator 100 is disclosed in Korean Unexamined Patent Publication No. 10-2005-0001378.

The outer drum unit 30 includes an outer drum 31 installed to the base plate 92 to be rotatable by a driving motor 91, a plurality of outer rollers 33 installed to the outer drum 31 at predetermined intervals, and first guide rollers 32 for guiding the skelp 1 wound on the outer drum 31. The outer drum unit 30 receives the skelp 1 from the input unit 80 and winds the skelp 1 on a circumferential surface formed by the outer rollers 33, and supplies the skelp 1 to the inner drum unit 40 through a lead roller unit 60.

The interval of the first guide rollers 32 is adjusted to correspond to the width of the skelp 1. In other words, the first guide rollers 32 move left and right by the rotation of an outer screw rod 32a to adjust the interval. The outer screw rod 32a is rotated by the rotation of an outer sprocket 32c, and the outer sprocket 32c is connected to a neighboring outer sprocket 32c by an outer chain 32d. In other words, a worker rotates the outer sprocket 32c manually so that the outer screw rods 32a are rotated at once, thereby adjusting the interval between the first guide rollers 32.

The inner drum unit 40 includes an inner drum 43 fixed to the base plate 92, a plurality of inner rollers 42 installed to the inner drum 43 at predetermined intervals, and second guide rollers 45 for guiding the skelp 1 wound on the inner drum 43. The inner drum unit 40 supplies the skelp 1 supplied via the lead roller unit 60 to the central drum unit 50.

The interval of the second guide rollers 45 is adjusted to correspond to the width of the skelp 1. In other words, the second guide rollers 45 move left and right by the rotation of an inner screw rod 45a to adjust the interval. The inner screw rod 45a is rotated by the rotation of an inner sprocket 45c, and the inner sprocket 45c is connected to a neighboring inner sprocket 45c by an inner chain 45d. That is, a worker rotates the inner sprocket 45c manually so that the inner screw rods 45a are rotated at once, thereby adjusting the interval between the second guide rollers 45.

As above, the vertical strip accumulator 100 may wind a skelp 1 of various widths by adjusting the interval between the first guide rollers 32 and the interval between the second guide rollers 45.

However, since the interval is adjusted manually, the vertical strip accumulator 100 has a problem that the worker may be injured by the skelp 1. Since the skelp 1 wound on the outer drum 31 and the inner drum 43 receives a great tension, the worker may be injured by the skelp 1 during the interval adjustment work.

To solve this problem, Korean Patent No. 10-0655476 discloses a configuration in which the interval between the first guide rollers 32 and the interval between the second guide rollers 45 for guiding the skelp 1 wound on the outer drum 31 are automatically adjusted, which may prevent the worker from being injured during the interval adjustment work.

However, the prior art has a problem in that an excessive strain is applied to the skelp 1 to deform the skelp 1, which adversely affects the pipe milling quality.

RELATED LITERATURES

Patent Literature (Patent Literature 1) 1. Korean Patent No. 10-0313474 (issued on Nov. 15, 2001)
(Patent Literature 2) 2. Korean Unexamined Patent Publication No. 10-2005-0001378 (published on Jan. 6, 2005)
(Patent Literature 3) 3. Korean Patent No. 10-0655476 (issued on Dec. 11, 2006)

DISCLOSURE

Technical Problem

The present disclosure is directed to providing a vertical strip accumulator, which may prevent an excessive tension from being applied to a skelp and thus prevent the pipe milling quality from being adversely effected due to the deformation of the skelp caused by the excessive tension.

Technical Solution

In one aspect of the present disclosure, there is provided a vertical strip accumulator, comprising: an inner drum unit having an inner drum; an outer drum unit installed at an outer side of the inner drum unit; a central drum unit installed at an inner side of the inner drum unit; and an input unit configured to carry a skelp supplied from an uncoiler to the outer drum unit, wherein the outer drum unit includes: an outer drum configured to selectively rotate forward and reverse; a first power source configured to provide a power to the outer drum; an outer roller installed to the outer drum; and a first control unit connected to the first power source to control the operation of the first power source, wherein the input unit includes: a carrying roller provided in contact with the skelp; a second power source configured to supply a power to the carrying roller; and a second control unit connected to the second power source to control the operation of the second power source.

Also, when the skelp is carried from the input unit to the outer drum unit and wound on the outer drum unit, the skelp may be controlled to have a tension within a preset range.

In addition, the first control unit and the second control unit may be connected to each other, and the first control unit may control the operation of the first power source and the second control unit controls the operation of the second power source so that a carrying speed at which the skelp supplied from the uncoiler is carried from the input unit to the outer drum unit matches a winding speed at which the skelp carried from the input unit to the outer drum unit is wound on a circumferential surface formed by the outer roller.

Also, the first control unit and the second control unit may control the carrying speed of the skelp and the winding speed of the skelp based on a linear speed of a pipe mill.

In addition, the vertical strip accumulator may further comprise a sensor unit disposed to face the skelp and spaced apart from the outer drum unit to grasp the tension of the skelp that is wound on the outer drum unit.

Also, the sensor unit may be connected to the second control unit, and the second control unit may control the operation of the second power source according to the tension of the skelp measured by the sensor unit.

In addition, when a distance between the sensor unit and the skelp is measured to be smaller than a preset range, the second control unit may control to increase the tension of the skelp, and when the distance between the sensor unit and the skelp is measured to be greater than the preset range, the second control unit may control to decrease the tension of the skelp.

Also, the carrying roller may include a first roller disposed at a lower side; and a second roller disposed above the first roller, wherein at least one of the first roller and the second roller is provided movable to contact the skelp.

Advantageous Effects

Therefore, according to the embodiments of the present disclosure, it is possible to prevent an excessive tension from being applied to a skelp and thus prevent the pipe milling quality from being adversely effected due to the deformation of the skelp caused by the excessive tension.

In addition, since the tension situation of the skelp may be grasped more accurately through the sensor unit, it is possible to precisely control the speed of the skelp.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 3:
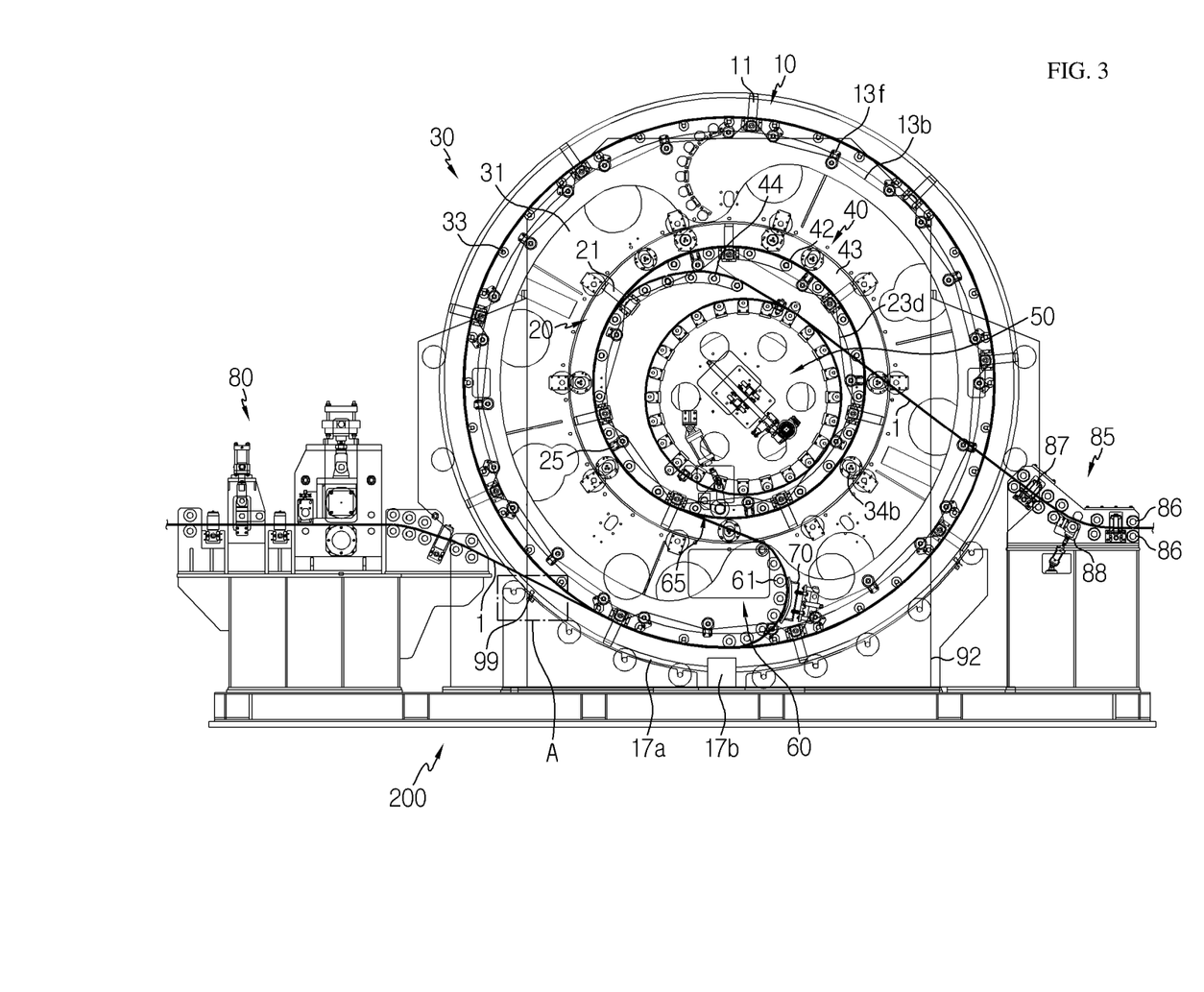
FIG. 3 is a front view showing a vertical strip accumulator according to an embodiment of the present disclosure.
Figure 4:
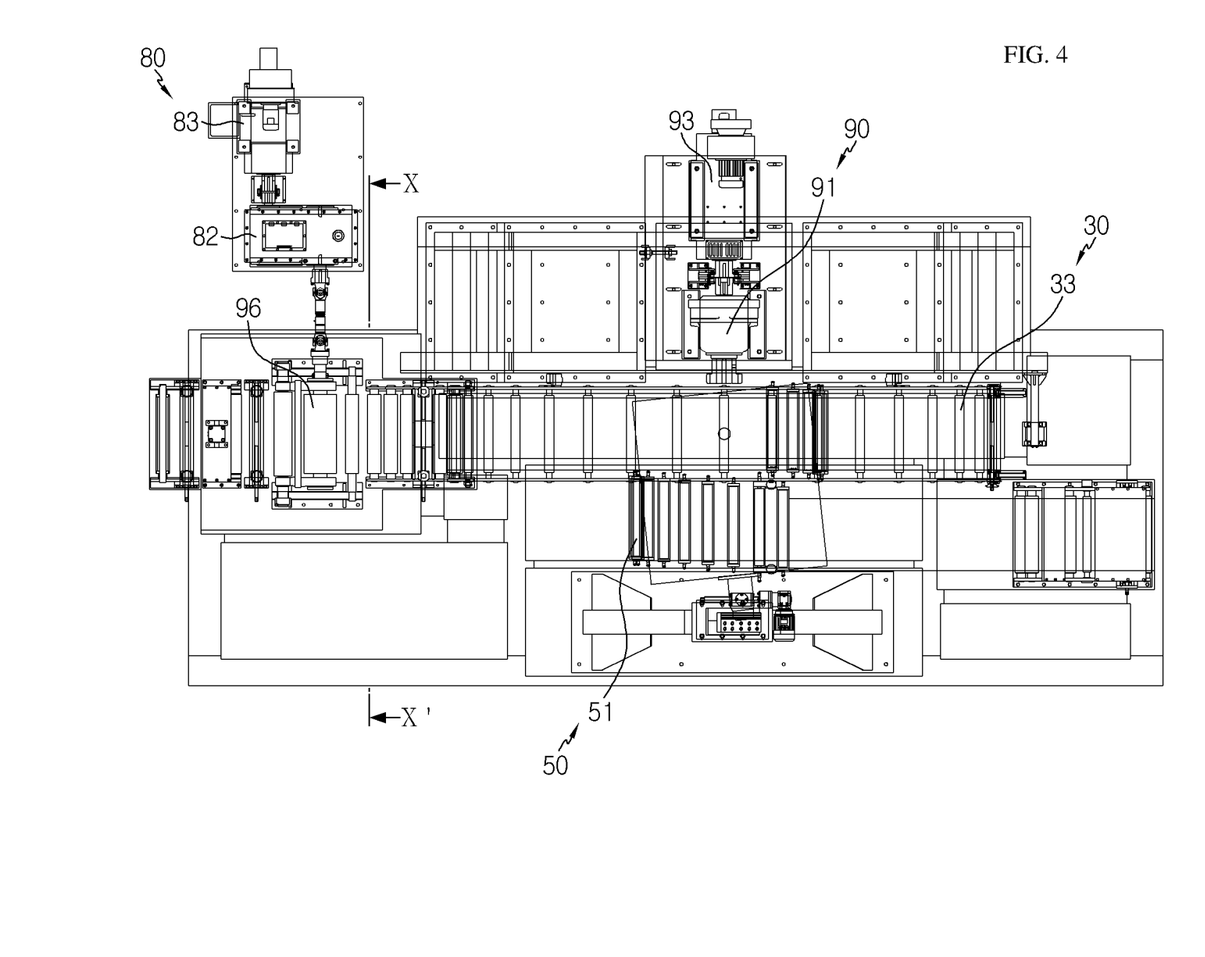
FIG. 4 is a plan view of FIG. 3.
Figure 5:
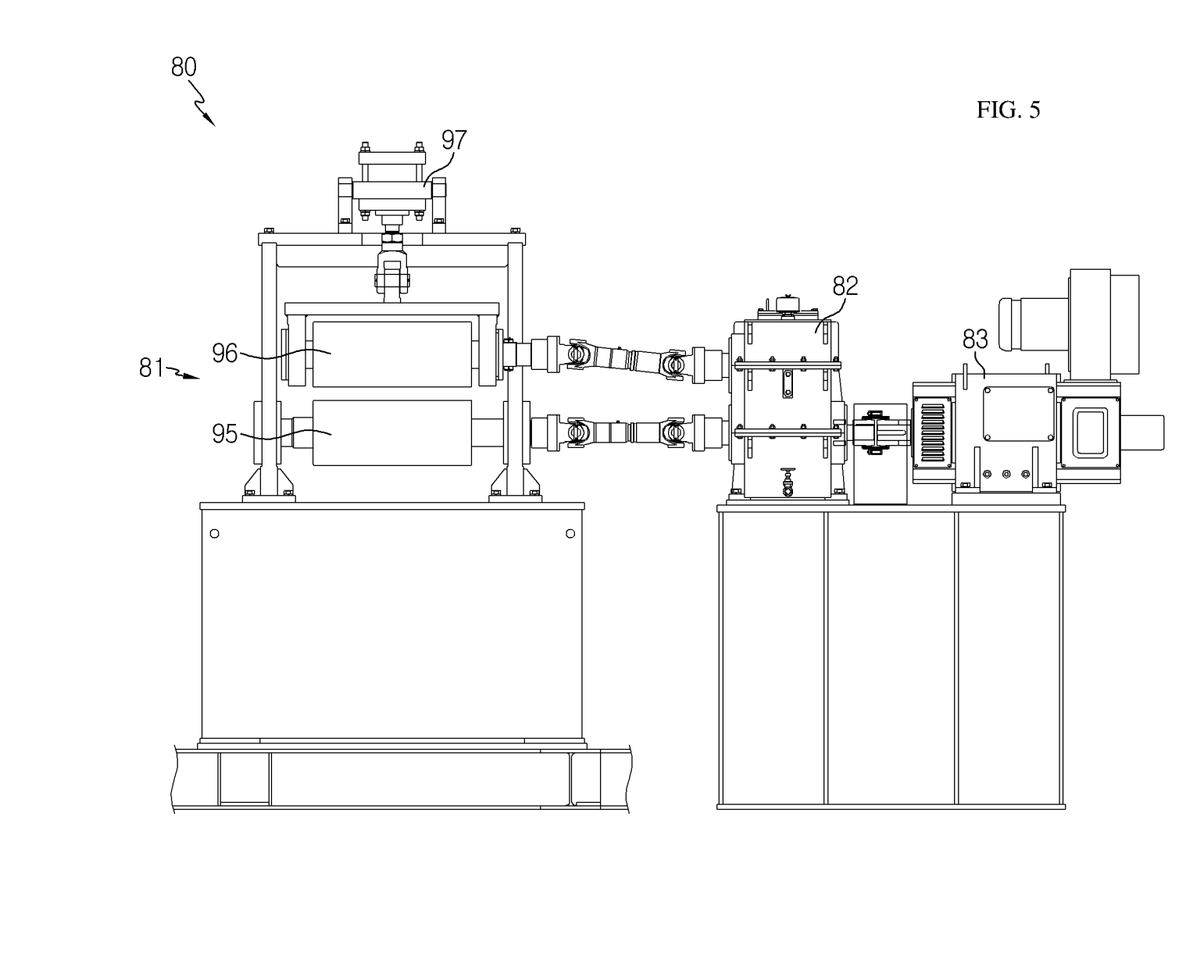
FIG. 5 is a cross-sectioned view, taken along the line X-X' of FIG. 4.
Figure 6:
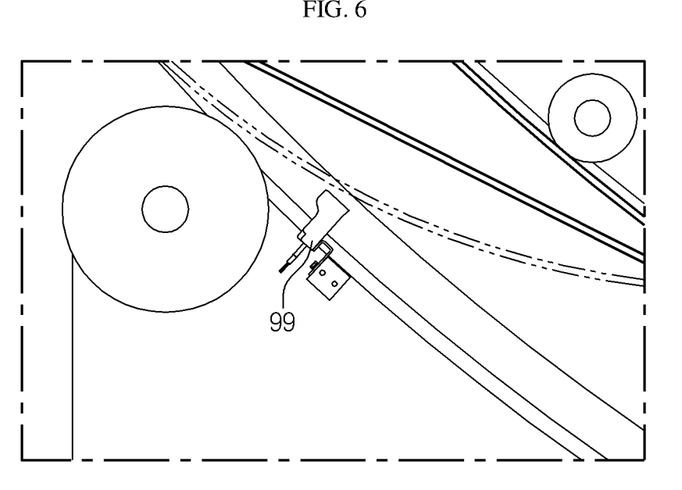
FIG. 6 is an enlarged view showing a portion A of FIG. 3.
Figure 7:
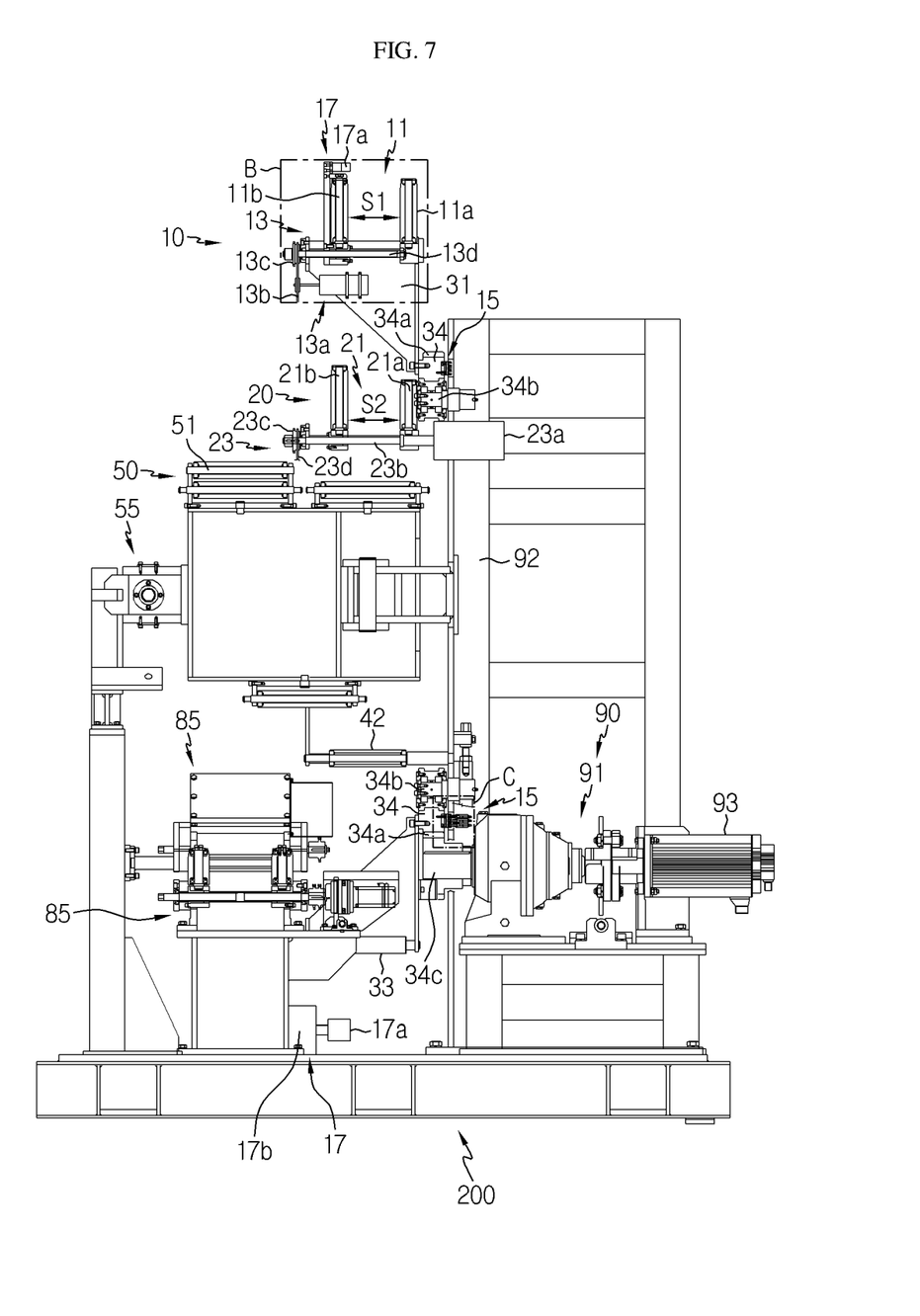
FIG. 7 is a side view of FIG. 3.
Figure 8:
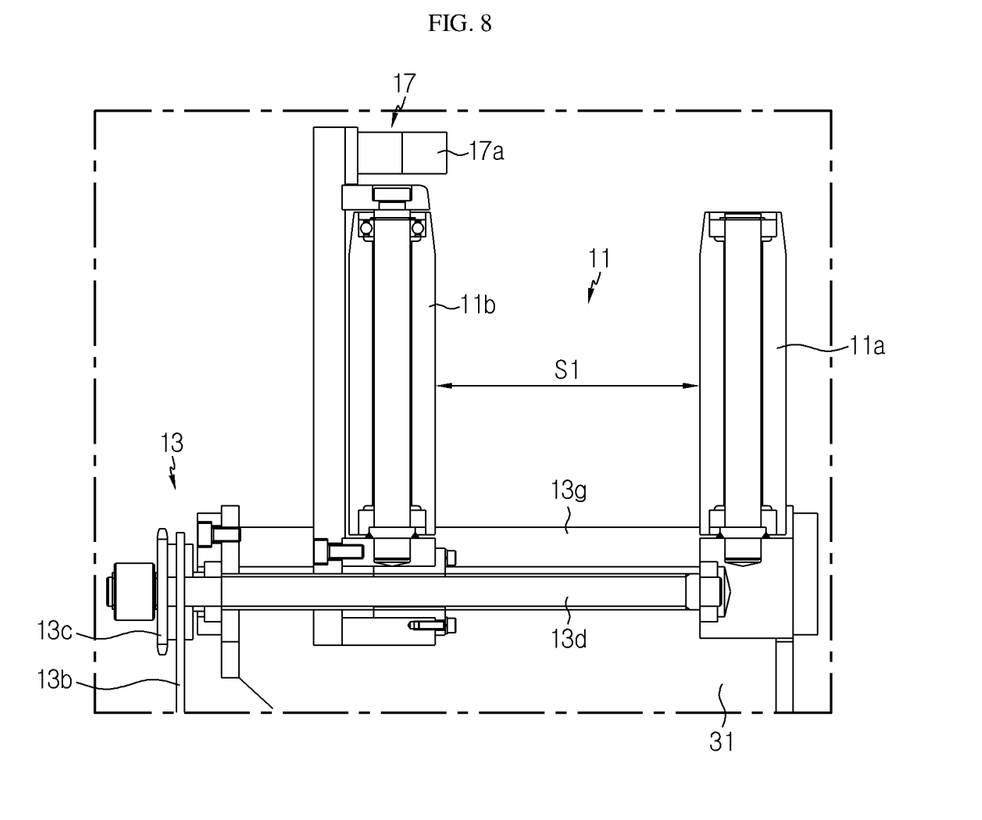
FIG. 8 is an enlarged view showing a portion B of FIG. 7.
Figure 9:
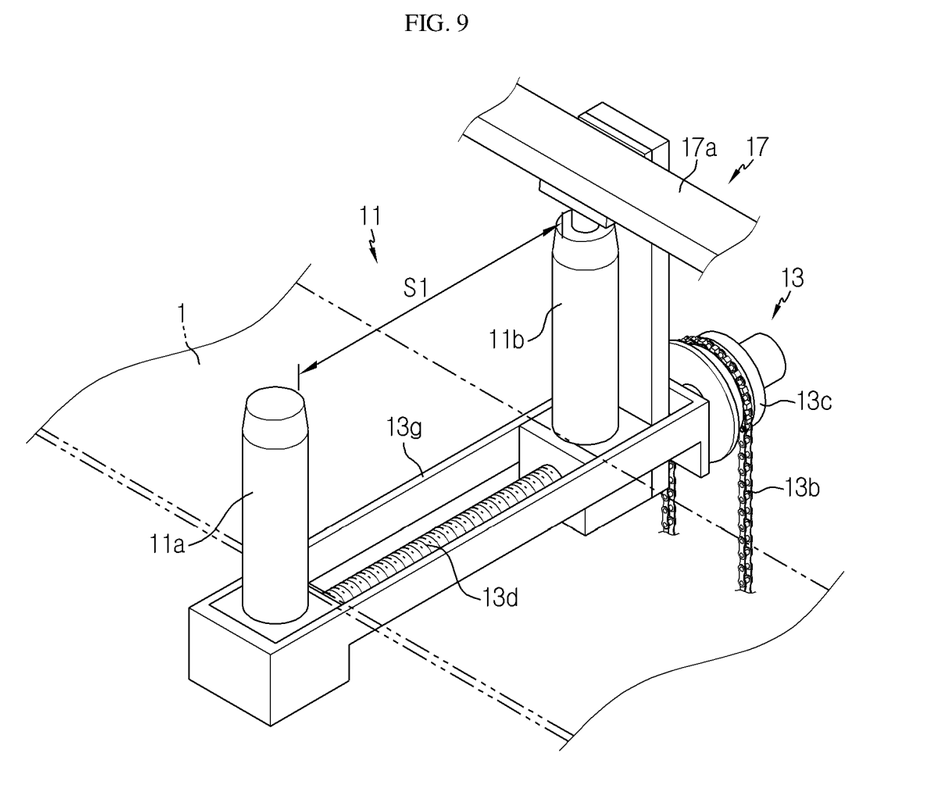
FIG. 9 is a perspective view showing a first guide roller and a first interval adjusting unit of FIG. 7.
Figure 10:
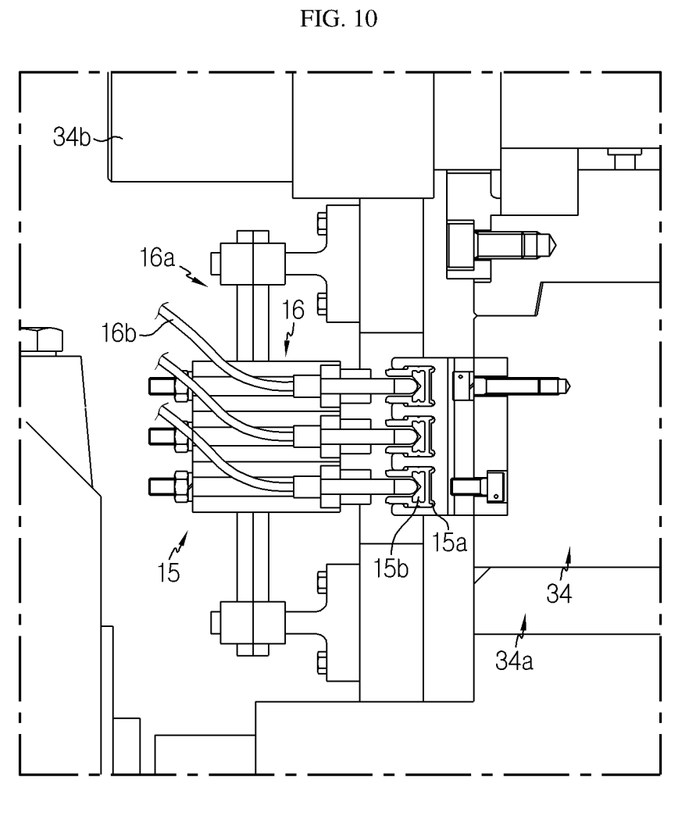
FIG. 10 is an enlarged view showing a portion C of FIG. 7.

FIG. 3 is a front view showing a vertical strip accumulator according to an embodiment of the present disclosure, FIG. 4 is a plan view of FIG. 3, FIG. 5 is a cross-sectioned view, taken along the line X-X' of FIG. 4, FIG. 6 is an enlarged view showing a portion A of FIG. 3, FIG. 7 is a side view of FIG. 3, FIG. 8 is an enlarged view showing a portion B of FIG. 7, FIG. 9 is a perspective view showing a first guide roller and a first interval adjusting unit of FIG. 7, and FIG. 10 is an enlarged view showing a portion C of FIG. 7. In FIG. 4, an air cylinder 97 and a first guide means 10 are not depicted.

Referring to FIGS. 3 to 10, a vertical strip accumulator 200 according to an embodiment of the present disclosure includes an inner drum unit 40, an outer drum unit 30, a central drum unit 50, and an input unit 80. Here, a skelp 1 is supplied from an uncoiler (not shown) and discharged to an output unit 85 via the input unit 80, the outer drum unit 30, the inner drum unit 40 and the central drum unit 50 sequentially.

The input unit 80 carries the skelp 1 supplied from the uncoiler (not shown) to the outer drum unit 30. Referring to FIGS. 3 to 5, the input unit 80 may include a carrying roller 81, a second power source 82, and a second control unit 83. The carrying roller 81 is connected to the second power source 82 and is driven by receiving a power from the second power source 82. Also, the carrying roller 81 contacts the skelp 1 to carry the skelp 1 toward the outer drum unit 30. The second power source 82 provides a power to the carrying roller 81 to drive the carrying roller 81. The second control unit 83 is connected to the second power source 82 to control the operation of the second power source 82, thereby controlling the rotation of the carrying roller 81. Here, the carrying roller 81 may include a first roller 95 and a second roller 96. The first roller 95 may be disposed at a lower side based on FIG. 5, and the second roller 96 may be disposed above the first roller 95 based on FIG. 5. In addition, at least one of the first roller 95 and the second roller 96 may be provided movable to contact the skelp 1. In the embodiment of FIG. 5, the second roller 96 disposed at the upper side is formed to contact the skelp 1 or release the contact with the skelp 1 while moving up and down by, for example, an air cylinder 97. A driving source for the second roller 96 is not limited to the air cylinder 97. Meanwhile, the outer drum unit 30, explained later, may include a first power source 90 for providing a power to the outer drum 31, and a first control unit 93 connected to the first power source 90 to control the operation of the first power source 90. Here, the first power source 90 may be provided in various ways using a motor, a cylinder, or the like, but, hereinafter, the first power source 90 will be mainly described as a driving motor 91.

The skelp 1 carried from the input unit 80 to the outer drum unit 30 may be controlled to have a tension within a preset range when it is carried from the input unit 80 to the outer drum unit 30 and wound on the outer drum unit 30. Hereinafter, the tension means a tensile force. In the prior art, only the first power source 90 that supplies a power to the outer drum 31 is provided. In this case, the skelp 1 is sequentially stacked through rotation. Here, if the skelp 1 is rotated and stored using only the first power source 90, an excessive tension beyond the preset range may be applied. If an excessive tension is applied to the skelp 1 beyond the preset range as above, the skelp 1 may be deformed, which adversely affects the pipe milling quality. To solve this problem, the vertical strip accumulator 200 according to an embodiment of the present disclosure is configured to include the second power source 82 and the second control unit 83 in the input unit 80. That is, in the case of the skelp 1 that is carried from the input unit 80 to the outer drum unit 30, since the power of the second power source 82 is transmitted to the skelp 1 through the carrying roller 81 coupled to the second power source 82, it is possible to prevent an excessive tension beyond the preset range from being applied thereto. In particular, the first control unit 93 and the second control unit 83 are connected to each other, and the first control unit 93 and the second control unit 83 may control the operations of the first power source 90 and the second power source 82, respectively, so that a first tension applied to the skelp 1 carried from the input unit 80 to the outer drum unit 30 and a second tension applied to the skelp 1 carried from the input drum 80 to the outer drum unit 30 and wound on the outer drum unit 30 have similar values within a preset range, preferably so that the first tension and the second tension have the same value within the preset range. Here, the first control unit 93 and the second control unit 83 may control the operations of the first power source 90 and the second power source 82, respectively, so that a speed at which the skelp 1 carried from, for example, an uncoiler (not shown) is carried from the input unit 80 to the outer drum unit 30, namely a carrying speed of the skelp 1, matches a speed at which the skelp 1 carried from the input unit 80 to the outer drum unit 30 is wound on a circumferential surface formed by the outer roller, namely a winding speed of the skelp 1. That is, in order to prevent an excessive tension, the first control unit 93 and the second control unit 83 may control the operations of the first power source 90 and the second power source 82, respectively, so that a length of the skelp 1 moved from the input unit 80 to the outer drum unit 30 per unit time matches a length of the skelp 1 wound on the circumferential surface formed by the outer roller per the same unit time. Here, the first control unit 93 and the second control unit 83 may control the operations of the first power source 90 and the second power source 82, respectively, so that the carrying speed of the skelp 1 and the winding speed of the skelp 1 have the same value based on a linear speed of a pipe mill.

The output unit 85 includes an output carrying roller 86 installed horizontally, output vertical rollers 87 installed to be spaced at a predetermined interval to guide the movement of the skelp 1, and an output close-contact roller 88 configured to reciprocate vertically by a cylinder and provided in close contact with the skelp 1.

The output vertical roller 87 guides the skelp 1 at a side thereof so that the skelp 1 does not deviate from the output unit 85. The output close-contact roller 88 prevents the skelp 1 from vertically fluctuating due to an irregular rotating speed of the outer drum 31 or the like.

The outer drum unit 30 is installed at an outer side of the inner drum unit 40. The outer drum unit 30 may include an outer drum 31, a first power source 90, an outer roller 33, and a first control unit 93. The outer drum 31 may be provided to selectively rotate forward and reverse by the first power source 90. That is, the outer drum 31 may be installed to the base plate 92 to be rotatable by the driving motor 91. In addition, the driving motor 91, which is the first power source 90, provides a power to the outer drum 31. Also, the plurality of outer rollers 33 may be installed to the outer drum 31 to be spaced apart at predetermined intervals. In addition, the first control unit 93 is connected to the driving motor 91 to control the operation of the driving motor 91.

The outer drum unit 30 receives the skelp 1 from the input unit 80, winds the skelp 1 on the circumferential surface formed by the outer rollers 33, and supplies the skelp 1 to the inner drum unit 40 through the lead roller unit 60.

The outer drum 31 is installed to the base plate 92 to be rotatable. The outer drum 31 and the base plate 92 are installed perpendicular to the ground. This is because the central drum unit 50 is installed to the base plate 92 to be pivotal by a predetermined angle so that the skelp 1 supplied through the input unit 80 may be parallel to the skelp 1 discharged to the output unit 85. This will be explained later in detail.

The outer drum 31 may be selectively rotated forward or reverse by the driving motor 91. On a rear surface of the outer drum 31, as shown in FIG. 4, a drum ring 34 is fixed. Support rollers 34b with a shaft fixed to the base plate 92 are installed to an inner circumference of the drum ring 34 at a predetermined interval to rotatably support the drum ring 34, and a drum chain 34a is installed to an outer circumference of the drum ring 34. The drum chain 34a receives a driving power from a driving sprocket 34c that is rotated by the driving motor 91. That is, the driving power of the driving motor 91 is transmitted to the outer drum 31 through the driving sprocket 34c, the drum chain 34a and the drum ring 34 to rotate the outer drum 31. Meanwhile, in this specification, 'forward rotation' means rotation in a counterclockwise direction in FIG. 3, and 'reverse rotation' means rotation in a clockwise direction.

The outer rollers 33 are installed to form a circle on the outer drum 31 to wind the skelp 1 as the outer drum 31 rotates.

The first guide means 10 may be provided in plural and guide the skelp 1 wound on the outer drum 31. The first guide means 10 includes a pair of first guide rollers 11 perpendicular to the outer roller 33, a first interval adjusting unit 13 for adjusting an interval S1 between the pair of first guide rollers 11 according to the width of the skelp 1, and a power supply 15 for supplying a power to the first interval adjusting unit 13.

The pair of first guide rollers 11 are installed at a predetermined interval along the circumferential direction of the outer drum 31. The pair of first guide rollers 11 are installed so that two first guide rollers 11a, 11b are separated by a predetermined distance. Among the two first guide rollers 11a, 11b, one first guide roller 11a is fixed, and the other first guide rollers 11b is moved by an outer screw rod 13d. The distance S1 between the two first guide rollers 11a, 11b is adjusted by the first interval adjusting unit 13.

The first interval adjusting unit 13 adjusts the interval between the pair of first guide rollers 11 according to the width of the skelp 1. The first interval adjusting unit 13 includes a first interval adjusting motor 13a installed to the outer drum 31, an outer chain 13b for transmitting a driving power of the first interval adjusting motor 13a, an outer sprocket 13c rotating by the outer chain 13b, and an outer screw rod 13d rotating together with the outer sprocket 13c.

The first interval adjusting motor 13a is installed to the outer drum 31 and rotates together with the outer drum 31. A power supply 15 is provided to supply a power to the first interval adjusting motor 13a that rotates together with the outer drum 31 as above. The power supply 15 will be described later.

The outer chain 13b transmits the driving power of the first interval adjusting motor 13a to the outer sprocket 13c. As shown in FIG. 3, the outer chain 13b is installed to connect the outer sprockets 13c to each other. Thus, the plurality of outer sprockets 13c installed to the outer drum 31 are rotated simultaneously by the driving power transmitted from the first interval adjusting motor 13a, thereby simultaneously adjusting the interval S1 between the first guide rollers 11a, 11b. Meanwhile, an unexplained reference sign 13f indicates an auxiliary sprocket for adjusting the tension of the outer chain 13b.

The outer screw rod 13d is connected to the outer sprocket 13c and rotates together with the outer sprocket 13c. One of the two first guide rollers 11a, 11b is installed to the outer screw rod 13d and is moved by the rotation of the outer screw rod 13d.

As shown in FIG. 7, the first interval adjusting unit 13 includes a first guider 13g for guiding the movement of the first guide roller 11b. The first guider 13g also prevents the first guide roller 11b from falling during movement.

The first interval adjusting unit 13 includes is an interval detecting member 17 for detecting the interval S1 between the pair of first guide rollers 11, and a control unit (not shown) for driving the first interval adjusting motor 13a according to the interval S1 detected by the interval detecting member 17.

For example, if the interval S1 between the first guide rollers 11a, 11b is greater than or smaller than the width of the skelp 1 input by the user, the control unit drives the first interval adjusting motor 13a to rotate the outer screw rod 13d so that the first guide roller 11b is moved to adjust the interval S1 between the first guide rollers 11a, 11b.

Further, the interval detecting member 17 includes a circular roll 17a installed to connect the first guide rollers 11b moved by the rotation of the outer screw rod 13d to each other among the pair of first guide rollers 11 as shown in FIGS. 3 and 7, a cylinder 17b having a piston rod installed in contact with the roll 17a as shown in FIG. 4 to extend or contract according to the movement of the first guide roller 11b, and an interval measuring sensor (not shown) for detecting the movement of the piston rod and transmitting a signal thereof to the control unit.

The roll 17a is moved together with the first guide roller 11b. As the roll 17a moves, the piston rod expands or contracts, and the interval measuring sensor detects the expansion and contraction of the piston rod and transmits a signal thereof to the control unit. Then, the control unit compares the interval S1 detected by the interval measuring sensor with the width of the skelp 1 and controls the operation of the first interval adjusting motor 13a.

The power supply 15 supplies a power to the first interval adjusting motor 13a. Since the first interval adjusting motor 13a is installed to the rotating outer drum 31 and rotates together, it is impossible to supply a power to the first interval adjusting motor 13a using a common power cable.

To solve this, as shown in FIGS. 5 and 8, the power supply 15 has a trolley structure. The trolley structure is a structure widely used in the art to supply a power to a moving object, for example a crane. That is, the power supply 15 includes a circular concave groove 15a formed at a rear surface of the outer drum unit 30, a power supply line 15b installed in the concave groove 15a, and a power supply member 16 installed to the base plate 92 to contact the power supply line 15b while the outer drum 31 is rotating forward or reverse.

The power supply 15 has three concave grooves 15a in the form of parallel circles to supply a three-phase power. The concave groove 15a is preferably formed at a rear surface of the drum ring 34.

The power supply member 16 supplies a power by contacting the rotating power supply line 15b in a state of being fixed to the base plate 92. The power supply member 16 is fixed to the base plate 92 using a fixing member 16a. An unexplained reference sign 16b designates a power supply cable.

The skelp 1 wound on the outer drum 31 is led to the inner drum unit 40 via the lead roller unit 60. As shown in FIG. 3, the lead roller units 60 are arranged at a predetermined curvature and a predetermined interval so that the skelp 1 moving via the outer roller 33 is naturally led to the inner drum unit 40. The lead roller unit 60 is installed to the outer drum 31 and rotates together with the outer drum 31.

The lead roller unit 60 is rotated together with the outer drum 31 and winds the skelp 1 simultaneously on the outer roller 33 and the inner roller 42. The rotary-type vertical strip accumulator 200 includes a friction means 70 for selectively pressing the lead roller 61 and a tension adjusting unit 65 for applying a predetermined tension to the skelp 1 moving via the lead roller unit 60.

The structure and principle for winding the skelp 1 by the friction means 70, the tension adjusting unit 65 and the lead roller unit 60 are disclosed in Korean Unexamined Patent Publication No. 10-2005-0001378.

Referring to FIG. 3, the inner drum unit 40 may be fixedly installed to a predetermined base plate 92. The inner drum unit 40 may include an inner drum 43, a plurality of inner rollers 42, and a second guide means 20. The inner drum 43 may be fixedly installed to the base plate 92. In addition, the plurality of inner rollers 42 may be installed to the inner drum 43 at predetermined intervals. Also, the second guide means 20 may be provided to guide the skelp 1 that is wound on the inner drum 43.

The inner drum unit 40 supplies the skelp 1 supplied via the lead roller unit 60 to the central drum unit 50.

The inner drum 43 is installed inside the outer drum unit 30 of the base plate 92. The inner rollers 42 are installed to the inner drum 43 at a predetermined interval to wind the skelp 1 supplied through the outer drum unit 30 and the lead roller 61.

The second guide means 20 guides the skelp 1 that is wound on the inner drum 43. The second guide means 20 includes a pair of second guide rollers 21 perpendicular to the inner roller 42 and a second interval adjusting unit 23 for adjusting an interval S2 between the second guide rollers 21a, 21b.

The pair of second guide rollers 21 are installed at a predetermined interval along the circumferential direction of the inner drum 43. The pair of second guide rollers 21 are installed so that the two second guide rollers 21a, 21b are spaced apart by a predetermined distance S2. The distance S2 is adjusted by the second interval adjusting unit 23.

The second interval adjusting unit 23 adjusts the interval S2 between the second guide rollers 21a, 21b according to the width of the skelp 1. The second interval adjusting unit 23 includes a second interval adjusting motor 23a installed to the base plate 92, an inner screw rod 23b rotated by the second interval adjusting motor 23a, an inner sprocket 23c installed to the inner screw rod 23b, and an inner chain 23d for connecting the inner sprockets 23c to each other to transmit a driving power. The driving power of the second interval adjusting motor 23a is transmitted to the neighboring inner sprocket 23c through the inner screw rod 23b, the inner sprocket 23c and the inner chain 23d. As the inner sprockets 23c are rotated simultaneously by the inner chain 23d, the interval S2 between the second guide rollers 21a, 21b may be adjusted simultaneously. Meanwhile, an unexplained reference sign 25 indicates an auxiliary sprocket for adjusting the tension of the inner chain 23d.

Among the two second guide rollers 21a, 21b, one second guide roller 21a is fixed to the second guider (not shown in FIG. 4), and the other second guide rollers 21b is installed to the inner screw rod 23b, thereby adjusting the interval S2 by the rotation of the inner screw rod 23b.

The skelp 1 moving via the inner drum unit 40 is moved to the central drum unit 50 via an inclined portion 44 at which rollers are installed obliquely. That is, as a drawing motor (not shown) installed to a pipe mill (not shown) operates to draw the skelp 1, the skelp 1 is supplied to the output unit 85 via the inclined portion 44 and the central drum unit 50, from a region of the skelp 1 wound on an inner side of the inner roller 42.

In this process, if the outer drum 31 is rotated at a speed faster than the drawing speed of the skelp 1 supplied to the output unit 85 by adjusting the driving speed of the driving motor 91, the skelp 1 is wound and stored on the outer roller 33 and the inner roller 42. The skelp 1 is stored in the vertical strip accumulator 200 as much as an amount obtained by subtracting the length of the skelp 1 discharged to output unit 85 from the length of the skelp 1 supplied from input unit 80.

The central drum unit 50 is installed inside the inner drum unit 40. In addition, the central drum unit 50 may include guide rollers 51 and a pivot adjusting means 55. The guide rollers 51 are helically mounted to the outer circumference, and the pivot adjusting means 55 enables the central drum to rotate at a predetermined angle relative to the base plate 92. The central drum unit 50 is pivotally installed to the base plate 92 so that the skelp 1 discharged to the output unit 85 becomes parallel to the skelp 1 supplied from the input unit 80. The structure of the central drum unit 50 is disclosed in Korean Unexamined Patent Publication No. 10-2005-0001378.

Referring to FIGS. 3 and 6, a sensor unit 99 may be disposed to face the skelp 1 and be spaced apart from the outer drum unit 30 in order to grasp a tension level of the skelp 1 wound on the outer drum unit 30. The sensor unit 99 is connected to the second control unit 83. The first control unit 93 may be provided to control the operation of the first power source 90 and the second control unit 83 may be provided to control the operation of the second power source 82 according to the tension of the skelp 1 measured by the sensor unit 99. Here, if the distance between the sensor unit 99 and the skelp 1 is measured to be smaller than a preset range, the second control unit 83 may control the operation of the second power source 82 to increase the tension amount of the skelp 1. For example, if the skelp 1 wound on the outer drum unit 30 is sagged by gravity, the distance between the sensor unit 99 and the skelp 1 may be measured to be smaller than the set range. In addition, if the distance between sensor unit 99 and skelp 1 is measured to be greater than the preset range, the first control unit 93 and the second control unit 83 may control the operation of the second power source 82 to reduce the tension amount of the skelp 1.

Now, the process of operating the vertical strip accumulator 200 according to a preferred embodiment of the present disclosure will be described.

First, the input unit 80 carries the skelp 1 supplied from the uncoiler (not shown) to the outer drum unit 30. At this time, the first control unit 93 and the second control unit 83 are connected to each other to prevent the skelp 1 from being subjected to an excessive tension beyond the preset range, and the first control unit 93 and the second control unit 83 controls the operations of the first power source 90 and the second power source 82, respectively, so that the first tension applied to the skelp 1 carried from the input unit 80 to the outer drum unit 30 and the second tension applied to the skelp 1 carried from the input unit 80 to the outer drum unit 30 and wound on the outer drum unit 30 have the same value within the preset range. The first control unit 93 and the second control unit 83 may control the operations of the first power source 90 and the second power source 82, respectively, so that, for example, the speed at which the skelp 1 supplied from the uncoiler (not shown) is carried from the input unit 80 to the outer drum unit 30, namely the carrying speed of the skelp 1, matches the speed at which the skelp 1 carried from the input unit 80 to the outer drum unit 30 is wound on the circumferential surface formed by the outer rollers, namely the winding speed of the skelp 1.

Next, it will be described that the interval S1 between the first guide rollers 11a, 11b is adjusted by the first interval adjusting unit 13.

If the width of the skelp 1 is input by the worker, the control unit compares the interval S1 between the first guide rollers 11a, 11b with the width of the skelp 1. If the interval S1 is greater or smaller than the width of the skelp 1, the control unit drives the first interval adjusting motor 13a to adjust the interval S1.

The driving power of the first interval adjusting motor 13a is transmitted to the outer screw rod 13d through the outer chain 13b and the outer sprocket 13c to rotate the outer screw rod 13d. If the outer screw rod 13d is rotated, the first guide roller 11b moves. As shown in FIG. 3, since the outer chain 13b is installed to connect the outer sprockets 13c to each other, the interval S1 between the plurality of first guide rollers 11a, 11b may be simultaneously adjusted.

If the first guide roller 11b moves, the roll 17a installed to the first guide roller 11b moves together, and if the roll 17a moves, the piston rod expands or contracts. The interval detecting sensor installed to the cylinder 17b detects the extension or contraction of the piston rod and transmits a signal thereof to the control unit. The control unit stops the operation of the first interval adjusting motor 13a if the interval S1 corresponds to the width of the skelp 1 by the movement of the first guide roller 11b.

In this process, the power supplied to the first interval adjusting motor 13a is supplied by the power supply 15 having a trolley structure. As shown in FIGS. 4 and 8, the power supply line 15b is installed to be inserted into the concave groove 15a formed at the rear surface of the circular drum ring 34, and the power supply member 16 is installed to be inserted into the concave groove 15a so as to contact the power supply line 15b. If the outer drum 31 is rotated in a state where the power supply member 16 is fixed to the base plate 92, the contact between the power supply member 16 and the power supply line 15b is maintained even while the outer drum 31 is rotating, and thus the power may be supplied to the first interval adjusting motor 13a.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Reference Signs

| | |
|---|---|
| 10: first guide means | 11a, 11b: first guide roller |
| 13: first interval adjusting unit | 15: power supply |
| 17: interval detecting member | 20: second guide means |
| 21a, 21b: first guide roller | 23: second interval adjusting unit |
| 30: outer drum unit | 40: inner drum unit |
| 50: central drum unit | 60: lead roller unit |
| 65: tension adjusting unit | 70: friction means |
| 80: input unit | 81: carrying roller |
| 82: second power source | 83: second control unit |
| 85: output unit | 90: first power source |
| 93: first control unit | 95: first roller |
| 96: second roller | 97: air cylinder |
| 99: sensor unit | |

What is claimed is:

1. A vertical strip accumulator, comprising:
an inner drum unit having an inner drum;
an outer drum unit installed at an outer side of the inner drum unit;
a central drum unit installed at an inner side of the inner drum unit; and
an input unit configured to carry a skelp supplied from an uncoiler to the outer drum unit,
wherein the outer drum unit includes:
an outer drum configured to selectively rotate forward and reverse;
a first power source configured to provide a power to the outer drum;
an outer roller installed to the outer drum; and
a first control unit connected to the first power source to control the operation of the first power source,
wherein the input unit includes:
a carrying roller provided in contact with the skelp;
a second power source configured to supply a power to the carrying roller; and
a second control unit connected to the second power source to control the operation of the second power source;
wherein when the skelp is carried from the input unit to the outer drum unit and wound on the outer drum unit, the skelp is controlled to have a tension within a preset range;
wherein the first control unit and the second control unit are connected to each other, and
the first control unit controls the operation of the first power source and the second control unit controls the operation of the second power source so that a carrying speed at which the skelp supplied from the uncoiler is carried from the input unit to the outer drum unit matches a winding speed at which the skelp carried from the input unit to the outer drum unit is wound on a circumferential surface formed by the outer roller.

2. The vertical strip accumulator according to claim 1, wherein the first control unit and the second control unit control the carrying speed of the skelp and the winding speed of the skelp based on a linear speed of a pipe mill.

3. The vertical strip accumulator according to claim 2, further comprising:
a sensor unit disposed to face the skelp and spaced apart from the outer drum unit to grasp the tension of the skelp that is wound on the outer drum unit.

4. The vertical strip accumulator according to claim 3, wherein the sensor unit is connected to the second control unit, and
the second control unit controls the operation of the second power source according to the tension of the skelp measured by the sensor unit.

5. The vertical strip accumulator according to claim 4, wherein when a distance between the sensor unit and the skelp is measured to be smaller than a preset range, the second control unit controls to increase the tension of the skelp, and when the distance between the sensor unit and the skelp is measured to be greater than the preset range, the second control unit controls to decrease the tension of the skelp.

6. The vertical strip accumulator according to claim 1, wherein the carrying roller includes:
a first roller disposed at a lower side; and
a second roller disposed above the first roller,
wherein at least one of the first roller and the second roller is provided movable to contact the skelp.

* * * * *